United States Patent [19]

Ifill et al.

[11] Patent Number: 5,019,256
[45] Date of Patent: May 28, 1991

[54] ULTRAVIOLET LAMP RACK ASSEMBLY

[75] Inventors: Lee Ifill, Abington; Robert Walker, Bluebell; Steven Wolfe, Lansdale; Fiore Schena, Warminster, all of Pa.

[73] Assignee: Fischer & Porter Company, Warminster, Pa.

[21] Appl. No.: 600,597

[22] Filed: Oct. 19, 1990

[51] Int. Cl.$^5$ .................................................. C02 1/32
[52] U.S. Cl. .................................... 210/232; 210/192; 210/243; 250/435; 250/436; 422/24; 422/186.3
[58] Field of Search ............... 210/192, 243, 232, 748; 422/24, 186.3; 250/435, 436, 437, 438

[56] References Cited

U.S. PATENT DOCUMENTS

| | | | |
|---|---|---|---|
| 2,413,704 | 1/1947 | Glatthar et al. | 250/435 |
| 2,935,611 | 5/1960 | Myers | 250/435 |
| 3,948,772 | 4/1976 | Ellner | 250/436 |
| 4,017,734 | 4/1977 | Ross | 250/435 |
| 4,482,809 | 11/1984 | Maarschalkerweed | 250/435 |
| 4,757,205 | 7/1988 | Latel et al. | 250/435 |
| 4,767,932 | 8/1988 | Ellner | 250/435 |
| 4,825,083 | 4/1989 | Latel et al. | 250/435 |
| 4,872,980 | 10/1989 | Maarschalkerweed | 250/435 |

Primary Examiner—Peter Hruskoci
Assistant Examiner—Robert James Popovics

Attorney, Agent, or Firm—Michael Ebert

[57] ABSTRACT

A UV lamp rack assembly usable in an ultraviolet ray wastewater treatment system, the rack including a horizontal hanger bar. When the assembly is installed in a channel through which a stream of wastewater to be treated is conducted, the bar is then supported above the channel in the flow direction of the stream. Depending from the bar at an upstream position is a vertical rod along which sleeves are pivotally mounted at spaced points thereon whereby each sleeve can be swiveled in a horizontal plane. Depending from the bar at a downstream position is a vertical conduit along which detachable lamp couplers are mounted at corresponding points, each coupler housing a lamp socket that is connected through the conduit to a power source. Extending between each sleeve and the coupler corresponding thereto is a lamp unit formed by a transparent protective tube enclosed at its upstream end and housing an elongated UV lamp whose terminal pins are at the downstream end. The upstream end of the unit is slidably received in the rear section of the sleeve, while the downstream end of the unit is securely received in the coupler, the terminal pins of the lamp then being plugged into the socket to render the lamp operative. To remove a particular lamp unit from the rack, it is swiveled to an angular position.

14 Claims, 4 Drawing Sheets

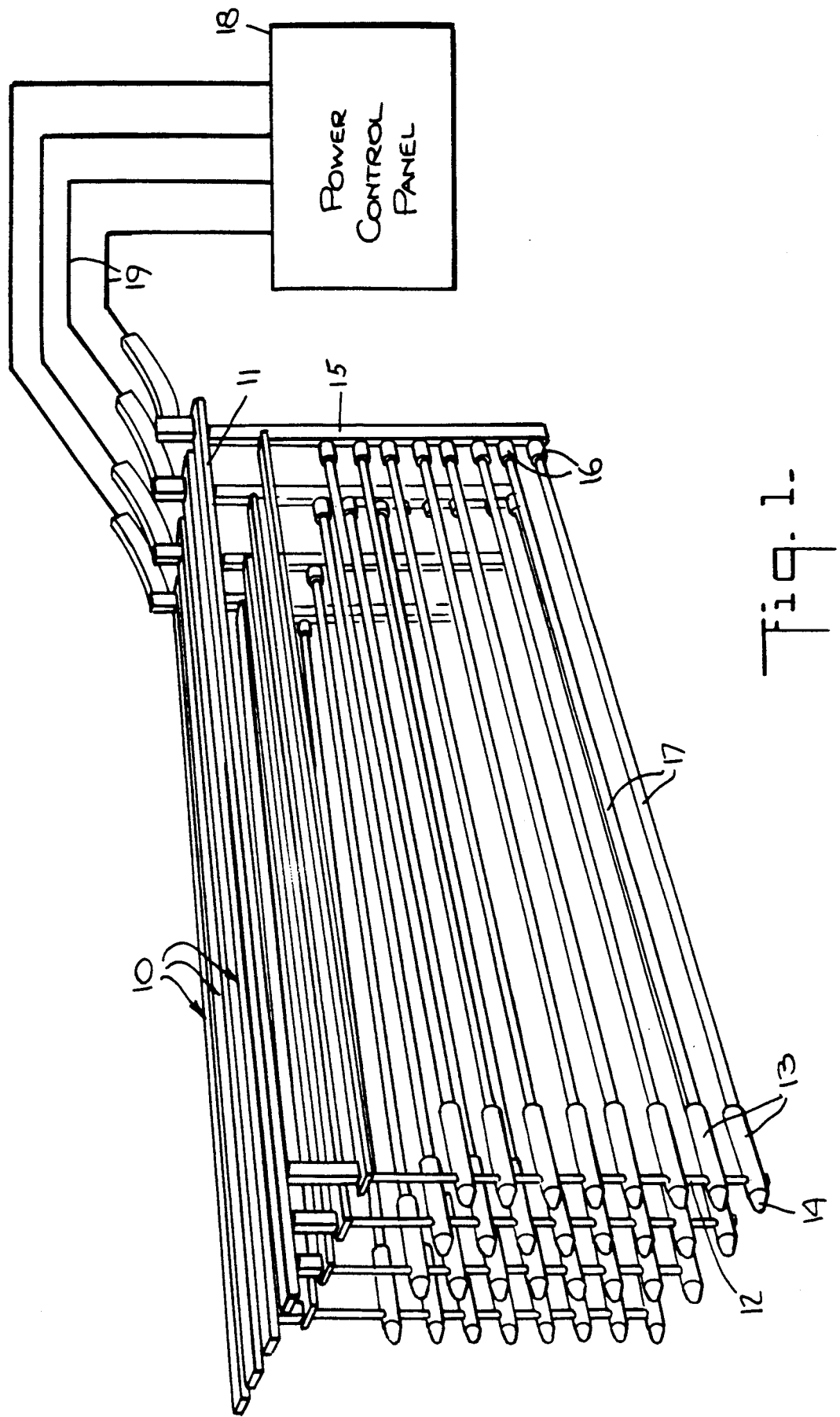

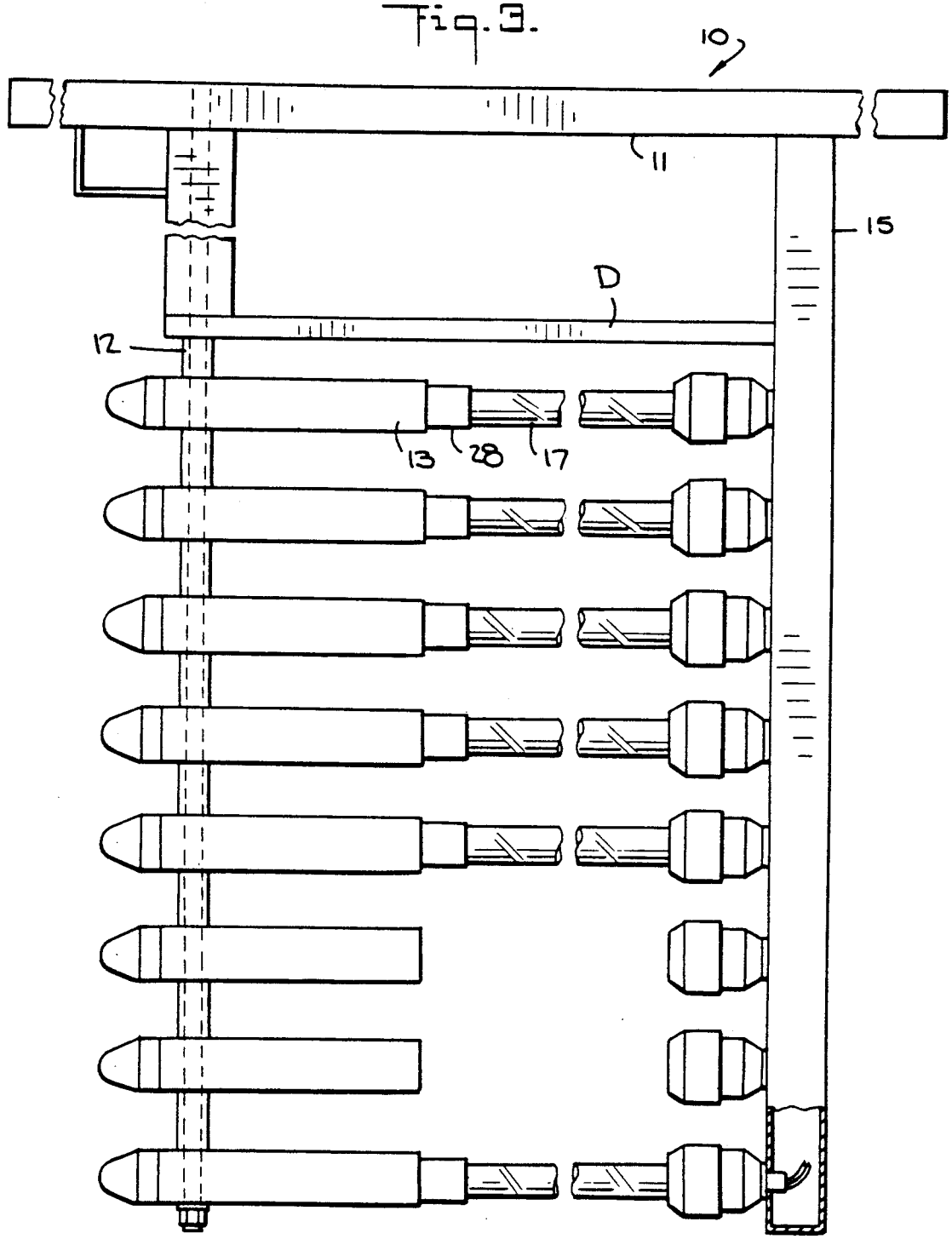

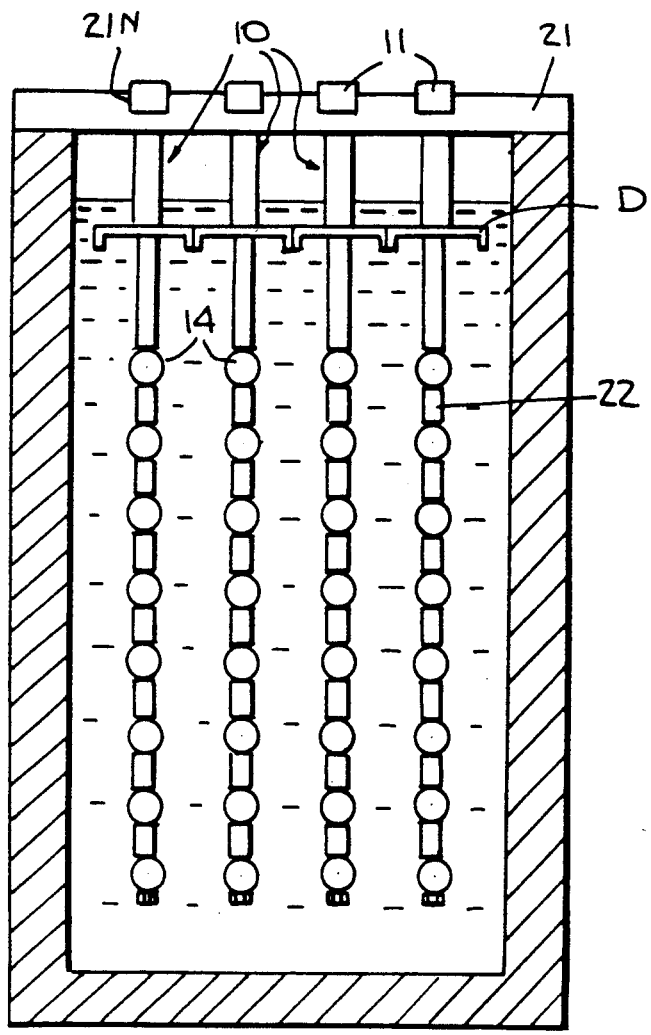
Fig. 2.
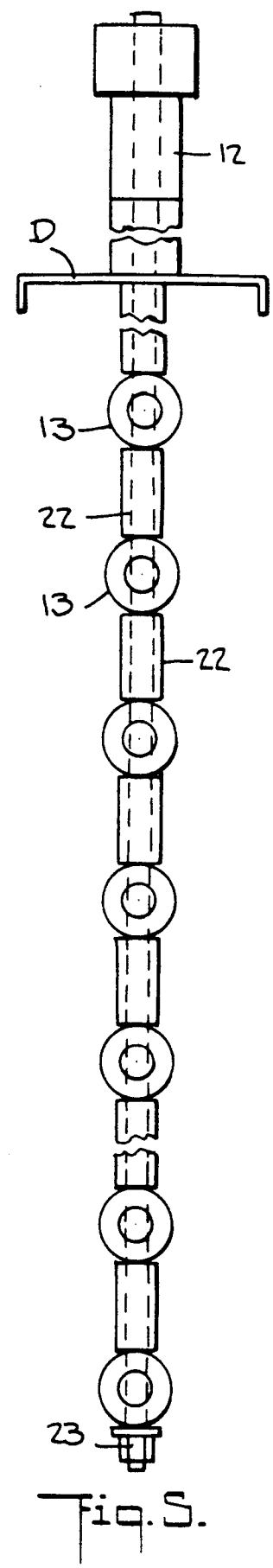
Fig. 5.
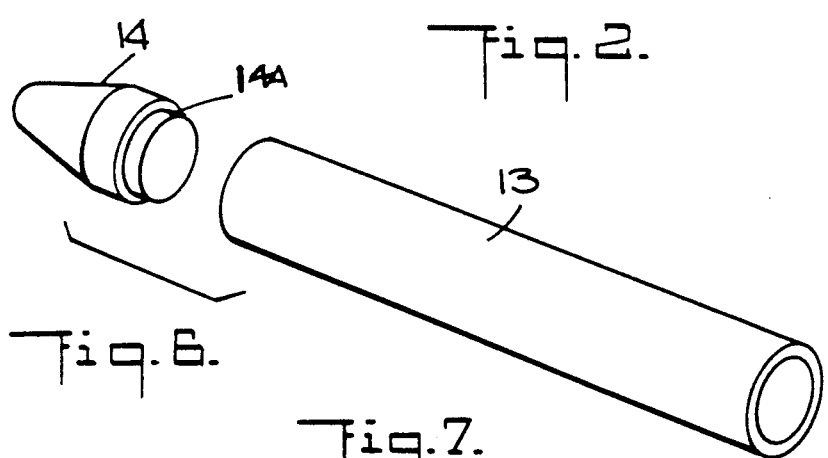
Fig. 6.
Fig. 7.
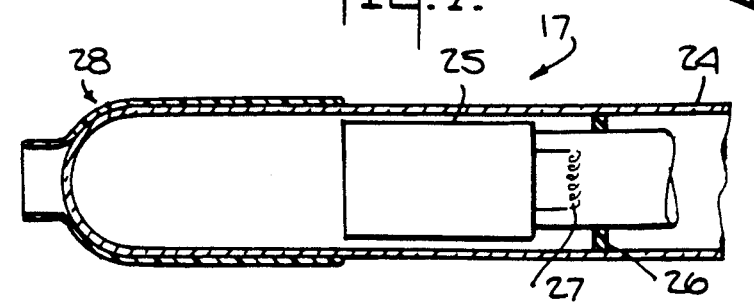

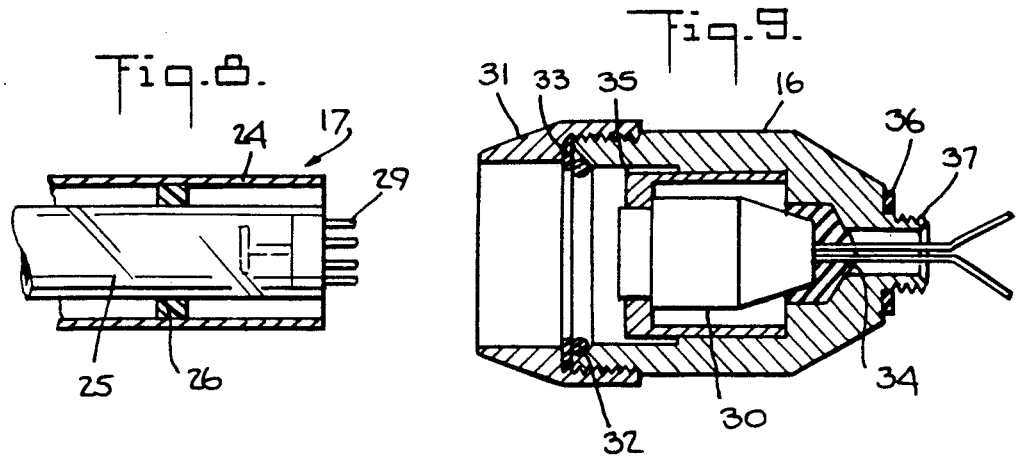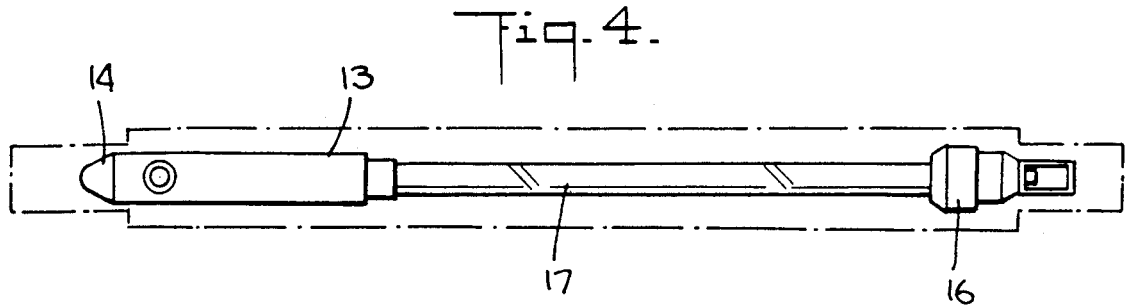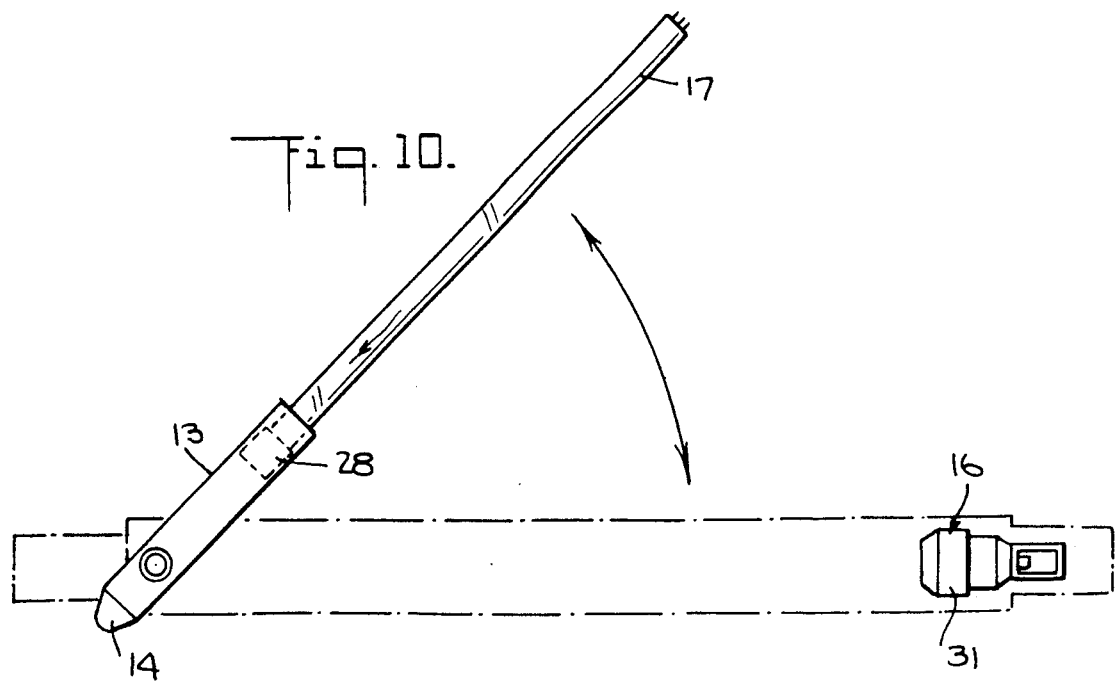

ULTRAVIOLET LAMP RACK ASSEMBLY

BACKGROUND OF INVENTION

1. Field of Invention

This invention relates generally to a UV lamp rack assembly for use in ultraviolet ray water and wastewater treatment systems, and more particularly to a modular assembly in which a vertical array of UV lamp units is supported on a rack, each unit being separately removable from the rack without disturbing the other units.

2. Status of Prior Art

Chlorination has heretofore been the most commonly used technique for disinfecting large quantities of wastewater. Chlorination involves the addition of small amounts of chlorine or chlorine compounds to the water to destroy undesirable microorganisms. A disadvantage peculiar to disinfection of the effluent of a wastewater treatment plant by chlorination is that such disinfection leaves a residual. This residual can be environmentally harmful, or undesirable should the body of water receiving the chlorinated discharge be reused for drinking waster. Other factors that must be taken into account are the hazards associated with transporting and storing chlorine in populated areas.

While in the specification we shall deal with the treatment of effluent from a wastewater treatment plant, it is to be understood that there are many other practical applications for the invention, such as in the disinfection of environmental, industrial and commercial waters.

The disadvantages of chlorination are absent in disinfection by ultraviolet radiation, for no chemicals are involved in this sterilization technique. Ultraviolet (UV) radiation at certain wavelengths has powerful germicidal properties, as a consequence of which the use of UV radiation for purposes of wastewater disinfection has been gaining rapidly in popularity. In a typical UV disinfection system, a source of ultraviolet radiation such as a bank of ultraviolet lamps is housed in a chamber through which the liquid to be treated is caused to flow, the liquid being subjected to UV radiation in the course of its passage through the chamber.

One such prior art UV disinfection arrangement is disclosed in the Ellner U.S. Pat. No. 3,948,772, in which a battery of parallel elongated ultraviolet lamps is supported on carrier frames in a water flow channel. The spacing of the lamps from each other and from the walls of the channel is such as to subject all of the water to the sterilizing effects of ultraviolet radiation.

Because ultraviolet lamps producing ultraviolet radiation of a suitable wavelength, typically 2540 Angstroms, have a limited life, provision must be made to replace a lamp when it has failed. By failure is meant not only a lamp that is altogether inoperative, but one whose level of radiation has fallen to an unacceptable degree. One approach to UV lamp replacement is disclosed in the Maarschalkeweerd U.S. Pat. No. 4,482,809, in which groups of vertically adjacent lamps are supported in individual rack assemblies which can be withdrawn from a treatment channel for replacement of the lamps.

In the arrangement described in the Maarschalkeweerd patent, the lamps are housed in transparent quartz tubes extending between sockets integral with the side arms of a rigid frame, at least one of the sockets having an end plug through which a lamp can be withdrawn longitudinally once the frame has been withdrawn from the channel. This arrangement is relatively complex to fabricate. And while it may appear to be advantageous that the lamps are rigidly secured to the frame, in practice any distortion of the frame during handling will strain the quartz tubes containing the lamps, thereby risking breakage.

In the removable lamp arrangement disclosed in the Latal et al. U.S. Pat. No. 4,825,083, individual ultraviolets lamp units are loosely and retractably located within frames supported in a water treatment channel. Individual frames supporting arrays of parallel lamp units may be removed from the channel, and the lamp units may be individually disengaged from the frame and disassembled for lamp replacement. The frames have unitary plug connectors so arranged that the plug of a frame must be disengaged from the power supply before that frame can be removed from the channel.

None of the prior art arrangements for the UV treatment of water by means of a bank or array of UV lamp units supported on a frame or rack make it possible manually to remove a particular lamp unit from the rack without difficulty, without in any way disturbing the other units and without the need for special tools.

SUMMARY OF INVENTION

In view of the foregoing, the main object of this invention is to provide an ultraviolet lamp rack assembly in modular form whereby a group of modules may be installed in parallel relation in the flow direction of a channel conducting a stream of water to be treated. The term "water" as used herein is applicable to wastewater or any other stream of water having microorganisms therein.

A significant advantage of the modular rack assembly is that any one of the assemblies may be separately withdrawn from the group for purposes of repair of maintenance without disturbing the other assemblies.

More particularly, it is an object of this invention to provide a UV lamp rack assembly in which any lamp unit included in the assembly may readily be removed manually therefrom without disturbing the remaining units and without the need for special tools for this purpose.

Yet another object of the invention is to provide a modular assembly of the above type in which each lamp unit is supported at its upstream end by a swivel sleeve, and at its downstream end by a detachable coupler, whereby the unit may be readily removed from the assembly by detaching it from the coupler and swinging the unit on the swivel sleeve to an angle permitting withdrawal of the unit therefrom.

Also an object of the invention is to provide an assembly of the above type in which each swivel sleeve which faces the incoming stream has a hydraulically-shaped cap inserted in its leading end to reduce turbulence and minimize pressure drop.

Briefly stated, these objects are attained in a UV lamp rack assembly for use in ultraviolet ray wastewater treatment system, the rack including a hanger bar. When the assembly is installed in a channel through which a stream of wastewater to be treated is conducted, the bar is then supported above the channel in the flow direction of the stream. Depending from the bar at an upstream position is a vertical rod along which sleeves are pivotally mounted at spaced points thereon whereby each sleeve can be swiveled in a horizontal plane. Depending from the bar at a downstream position is a vertical conduit along which detachable lamp couplers are mounted at corresponding points, each coupler housing a lamp socket that is connected through the conduit to a power source.

Extending between each sleeve and the coupler corresponding thereto is a lamp unit formed by a transparent protective tube enclosed at its upstream end and housing an elongated UV lamp whose terminal pins are at the downstream end. The upstream end of the unit is slidably received in the rear section of the sleeve beyond which is a clearance zone, while the downstream end of the unit is securely received in the coupler, the terminal pins of the lamp then being plugged into the socket to render the lamp operative.

To remove a particular lamp unit from the rack, should a need to do so arise, the downstream end of the tube is detached from the coupler and the lamp is unplugged from its socket, the unit then being shifted axially upstream into the clearance zone to a degree sufficient to clear the coupler, whereby the unit may then be swung on the swivel sleeve to an angular position permitting removal of the unit.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a perspective view of a group of modular UV lamp rack assemblies in accordance with the invention;

FIG. 2 is an upstream end view of a flow channel in which the group of assemblies is installed to irradiate the water stream flowing through the channel;

FIG. 3 is a side view of a single modular UV lamp rack assembly in accordance with the invention;

FIG. 4 is a top view of the assembly;

FIG. 5 separately illustrates the rod on which the swivel sleeves are supported;

FIG. 6 is a separate view of a single swivel sleeve and its end cap;

FIG. 7 is a sectional view of the upstream end of the lamp unit;

FIG. 8 is a sectional view of the downstream end of the lamp unit;

FIG. 9 is a section taken through the attachable coupler and the lamp socket therein; and FIG. 10 illustrates the manner in which a lamp unit may be removed from the assembly.

DETAILED DESCRIPTION OF INVENTION

The Module Group:

Referring now to FIG. 1, there is shown a group of like modules 10 each formed by a UV lamp rack assembly in accordance with the invention. Module 10 includes a long horizontal hanger bar 11 having a square cross section formed of stainless steel or other high-strength, non-corrosive metal. Depending from bar 11 at an upstream position is a vertical metal rod 12, and depending from bar 11 at a downstream position is a vertical metal conduit 15 having a rectangular cross section, conduit 15 serving as a waterproof passage for electrical cables.

Pivotally mounted on rod 12 at equi-spaced points therealong are metal sleeves 13, each swiveling in a horizontal plane. The leading end of each sleeve has a bullet-shaped cap 14 pressed therein, the cap being formed of synthetic plastic material, such as polyethylene or polypropylene. Mounted on conduit 15 in a direction facing sleeves 13 at corresponding equi-spaced points are detachable couplers 16, each housing a lamp socket.

Extending between each sleeve 13 on upstream rod 12 and the corresponding coupler 16 on conduit 15 is a lamp unit 17 whose upstream end is slidably received in the rear section of the sleeve and whose downstream end is securely received in the detachable coupler 16 in a manner to be described later in greater detail.

Each lamp unit 17 consists of an elongated tubular lamp capable of emitting ultraviolet ray energy at a wavelength having a sterilizing effect on the water irradiated thereby, the lamp being protectively housed within a quartz tube which is transparent to this radiation. Only the upstream end of the transparent tube is closed, the open downstream end received within coupler 16 being sealed thereby so that no water leaks into the tube. The UV lamp housed within the transparent tube is of the mercury vapor type having electrodes at either end. These electrodes are connected to terminal pins at the downstream end of the lamp, which pins plug into the lamp socket housed in the coupler.

The lamp sockets are connected by wires running through conduit 15 to a connector at the top end of the conduit, the connector of each assembly being connected to a power control panel 18 by a cable 19. The bottom end of conduit 15, which is immersed in the stream, is closed. A power control panel 18 which is at a suitable central location is provided with ballast assemblies for the lamps, circuit breakers, control switches and relays, meters and lamp-intensity monitors. The present invention is not concerned with how the UV lamps are energized and controlled, for means known in the art may be used for this purpose.

The concern of the present invention is with a modular UV lamp rack assembly having an array of lamp units in which each unit may readily be withdrawn and replaced without disturbing the other units. When, as shown in FIG. 2, a group of modules 10 are installed in parallel relation in a channel 20 conducting a stream of water to be treated, the ends of hanger bars 11 of each module are nested in a series of parallel notches 21N formed in transverse bridge plates 21. These plates are positioned at upstream and downstream positions across this channel, only the upstream plate being shown in FIG. 2.

Thus modules 10 are maintained by notches 21N in the bridge plates in parallel relation. Because the hanger bars 11 have a square cross section matching that of notches 21N, the modules are thereby prevented from swinging. The ends of the hanger bar which extend beyond rod 12 and conduit 15 fit into the notches and provide handles for the assembly.

In operation, the water stream entering the upstream end of channel 20 impinges on the bullet-shaped caps 14. These caps are hydraulically contoured to minimize turbulence and thereby reduce the pressure drop resulting from the presence of the group of modules in the channel. In practice, a photo sensor may be installed on the module to detect the level of UV radiation emanating from the array of lamp units to produce a signal proportional thereto. This signal is transmitted to control panel 18 to indicate the UV intensity level and to produce an alarm signal when this level falls below a predetermined set point.

Each module 10 is independent of the other modules in the group thereof, and because it is not bolted or otherwise attached to the bridge plates 21, it may be removed from the group for purposes of inspection and maintenance.

The UV Module:

As shown in FIGS. 2, 3 and 5, each module 10 includes an elongated metal deflector D whose interior surface has a specular finish which is mirror-like. The deflector is supported between upstream rod 12 and downstream conduit 15 above the uppermost lamp unit 17, and serves to reflect back into the water stream those UV rays emanating from the array of lamp units 17 which are upwardly directed. The deflector also functions to shield personnel looking down into the channel from ultraviolet rays which because of their intensity may be injurious to the eyes.

The width of deflectors D is such that the deflectors of adjacent modules almost touch, so as to block out UV radiation above the lamp rack. These deflectors also function as spacers between adjacent lamp racks and as stiffeners between the upstream and downstream legs of the racks.

As shown separately in FIG. 5, swivel sleeves 13 are pivotally supported adjacent their leading ends on vertical upstream rod 12 and are equi-spaced from each other by cylindrical metal spacers 22. The lower end of rod 12, which is an elongated bolt, is threaded to receive a nut 23. Thus it is a simple matter to assemble the sleeves and their spacers on the rod.

As shown separately in FIG. 6. the bullet-shaped cap 14, which is formed of synthetic plastic material, includes a neck 14A of reduced diameter which fits frictionally into the leading end of metal sleeve 13.

Each lamp unit 17, as shown separately in FIGS. 7 and 8, consists of a transparent, protective quartz tube 24 and an elongated UV lamp 25 coaxially supported therein by means of annular spacers 26. Quartz tube 24 functions as a temperature insulator or thermal barrier between the relatively cold water in which the unit is immersed and the hotter lamp surface.

FIG. 7 shows the upstream end of the unit, and it will be seen that quartz tube 24 is closed at this end and that lamp 25 is provided at this end with an electrode 27. This electrode is connected by a fine wire (not shown) to a terminal pin at the downstream end of the lamp. It is to be noted that a space exists between the end of lamp 25 and the corresponding end of quartz tube 24 to allow clearance for the lamp to slide forward (upstream) when it is disconnected from its socket.

The upstream end of lamp unit 17 is slidably received, as shown in FIG. 3, in the rear section of sleeve 13. In order to cushion this end, the upstream end of the unit is surrounded with a thin collar 28 of elastomeric material, such as flexible foam plastic polyurethane or neoprene, the collar being bonded to the tube or shrink fit thereon. Collar 28 extends over the rounded end of quartz tube 24, the extension forming a bumper to protect this end from rod 12 when assembly 17 is inserted in sleeve 13. At the downstream end of the lamp unit, as shown in FIG. 8, the quartz tube is open ended and the UV lamp which is coaxially supported therein is provided with terminal pins 29 which are connected to the lamp electrodes. While FIG. 8 shows four pins 29, only two of these pins are wired to electrodes, the other two serving only for mechanical stability. In practice, these extra two pins need not be used.

As shown in FIG. 9, detachable coupler 16 houses a lamp socket 30 into which terminal pins 29 are plugged. Lamp socket 30 is seated in a resilient grommet 34 through which extend the connecting wires for the lamp. A retaining sleeve 35 is press fitted into coupler 16 to mechanically hold socket 30 and grommet 34 in place. Grommet 34 functions to prevent leakage if there is a seal failure or breakage of the lamp, thereby preventing the liquid from contaminating adjacent lamps on the rack. Also provided is an O-ring washer 36 which provides a seal when coupler 16, which is provided at its rear end with an externally threaded nipple 37, is screwed into conduit 15.

Coupler 16 is provided with a locking nut 31 threadably received thereon. At the mouth of coupler 16 is a compressible O-ring 32 which engages the surface of the downstream end of the quartz tube to provide a liquid seal. When nut 31 is turned tight, it presses a washer 33 against O-ring 32.

Removal of Lamp Unit:

Each swivel sleeve 13 is normally at right angles to the supporting rod 12 of the rack. When a lamp unit 17 is to be installed on the rack, swivel sleeve 13 (see FIG. 10) is then swivelled out at an angle at which one can then slide the upstream end of lamp unit 17 into the rear section of the sleeve to a sufficient depth so that when the sleeve carrying the lamp unit is then swung back to its normal right angle position, the downstream end of the lamp unit clears the corresponding coupler 16. The lamp unit is then axially shifted in the downstream direction to enter coupler 16 whose nut 31 is then tightened to secure the plugged-in lamp unit in place.

When it becomes necessary to remove the lamp unit from the rack to replace the UV lamp or its protective tube, coupler nut 31 is then loosened to permit an operator to shift the lamp unit axially in the upstream direction and to disengage the terminal pins of the lamp from its socket in the coupler. The upstream end of lamp unit 17 is axially advanced into a clearance zone Z in the intermediate section of sleeve 13 (see FIG. 3) to a degree sufficient to cause the downstream end of the lamp unit to clear coupler 16 so that, as shown in FIG. 10, the lamp unit may then be swivelled to a convenient angle permitting its withdrawal from its sleeve 13. The lamp unit may then be replaced and returned to the rack.

In practice, one need not load the rack with its maximum capacity of lamp units; and while the drawing shows an array of eight lamp units, a smaller or larger number may be used when this number is appropriate to the disinfection requirements of the channel. For this purpose, instead of eight couplers in pipe 15, one may use a lesser number, and sealably plug the coupler holes at the unused coupler points on conduit 15. Or additional holes may be added to the conduit so that more lamp units may be added to the rack.

While there has been shown and described a preferred embodiment of an ultraviolet lamp rack assembly in accordance with the invention, it will be appreciated that many changes and modifications may be made therein without, however, departing from the essential spirit thereof. Thus instead of locating the ballasts for the UV lamps in power control panel 18, these ballasts and some electronic circuits may be housed in conduit 15 which is enlarged to accommodate the ballasts. Or the ballasts may be housed in a waterproof enclosure located under deflector D and above the lamps on the rack.

In the arrangement illustrated in FIG. 2, the lamp rack assembly is so placed that the water stream entering the channel impinges on the upstream or cap end of the assembly. In certain situations, it may be convenient or desirable to place the lamp rack assembly in the reverse direction with respect to the direction of flow.

We claim:

1. A UV lamp rack assembly adapted to be installed in a channel conducting a stream of water to be irradiated with ultraviolet rays, said assembly comprising:
   (a) a horizontal hanger bar having at an upstream position a vertical rod depending therefrom, and having at a downstream position a vertical conduit depending therefrom;
   (b) a series of swivel sleeves pivotally mounted at spaced points along the rod whereby each sleeve can be swivelled in a horizontal plane from a position normal to the rod to an angular position with respect thereto;
   (c) a series of detachable couplers mounted on the conduit at corresponding points therealong, each coupler having a lamp socket housed therein which is connected through the conduit to an external power source; and
   (d) a lamp unit extending between each of the sleeves and a corresponding coupler, said unit being constituted by a protective tube which is closed at its upstream end and an elongated UV lamp disposed within the tube and having terminal pins at its downstream end, the upstream end of the unit being slidably received in a rear section of the sleeve beyond which is an intermediate clearance zone, the downstream end of the unit being secured to the coupler with the terminal pins of the lamp plugged into the socket, whereby to remove a particular lamp unit from the assembly, the downstream end thereof is detached from its coupler and the lamp is unplugged from its socket, the unit then being shifted axially in the upstream direction into the clearance zone to a degree sufficient to clear the coupler, so that the unit may then be swung on its swivel sleeve to an angular position permitting withdrawal of the unit from its sleeve.

2. An assembly as set forth in claim 1, further including a cap inserted in the leading end of each sleeve, said cap being hydraulically contoured to reduce the pressure drop produced by the assembly in said channel.

3. An assembly as set forth in claim 2, wherein said cap is formed of synthetic plastic material and is provided with a neck of reduced diameter which fits into in the leading end of the sleeve.

4. An assembly as set forth in claim 1, wherein said sleeves are equi-spaced from each other by cylindrical spacers mounted on said rod between said sleeves.

5. An assembly as set forth in claim 1, further including a deflector extending between the rod and the conduit above the lamp unit which is uppermost.

6. An assembly as set forth in claim 1, further including a collar of elastomeric material surrounding the upstream end of the tube to cushion the unit when it is inserted in the sleeve.

7. An assembly as set forth in claim 1, wherein said coupler is provided with a locking nut, and an O-ring disposed at the mouth of the coupler to engage the surface of the tube inserted therein to seal the tube against water leakage.

8. An assembly as set forth in claim 1, wherein said hanger rod has a square cross section and extends at either end beyond the rod and the conduit to provide handles for the assembly.

9. An assembly as set forth in claim 8 installable in a channel having parallel side walls and upstream and downstream plates bridging the side walls, said plates having notches therein having a square cross section to nest the extended ends of the hanger bar whereby a bank of like assemblies may be suspended from the upstream and downstream plates.

10. An assembly as set forth in claim 9, wherein the assembly includes an elongated deflector extending between the rod and the conduit above the lamp unit which is uppermost, the assembly having a width such that when a bank of like assemblies are suspended from the plates, the deflectors thereof are in touching relation to each other.

11. An assembly as set forth in claim 1, wherein the socket in each coupler is seated in a sealing grommet through which wires connected to the lamp extend.

12. An assembly as set forth in claim 11, further including a retaining sleeve press-fitted into the coupler to mechanically hold the socket and grommet in place.

13. A UV lamp rack assembly adapted to be installed in a channel conducting a stream of water to be irradiated with ultraviolet rays, said assembly comprising:
   (a) a horizontal hanger bar having a vertical rod depending therefrom adjacent one end thereof and a vertical conduit depending therefrom adjacent the other end thereof;
   (b) a series of swivel sleeves having leading ends which are pivotally mounted at spaced points along the rod whereby each sleeve can be swivelled in a horizontal plane from a position normal to the rod to an angular position with respect thereto, each sleeve having a rear section and a clearance zone between said rear section and its leading end;
   (c) a series of detachable couplers mounted on the conduit at corresponding points therealong, each coupler having a lamp socket housed therein which is connected through the conduit to an external power source; and
   (d) a lamp unit extending between each of the sleeves and a corresponding coupler, said unit being constituted by a protective tube which is closed at one end of the unit and open at the other end thereof and an elongated UV lamp disposed within the tube and having terminal pins at the other end of the unit, the one end of the unit being slidably received in the rear section of the sleeve, the other end of the unit being secured to the coupler with the terminal pins of the lamp plugged into the socket, whereby to remove a particular lamp unit from the assembly, the other end thereof is detached from its coupler and the lamp is unplugged from its socket, the unit then being shifted axially into the clearance zone to a degree sufficient to clear the coupler, so that the unit may then be swung on its swivel sleeve to an angular position permitting withdrawal of the unit from its sleeve.

14. An assembly as set forth in claim 13, wherein the leading end of each sleeve is hydraulically contoured to reduce the pressure drop produced by the assembly in said channel.

* * * * *